Sept. 25, 1934.  F. TWYMAN ET AL  1,974,522
COUNTING OF MICROSCOPIC BODIES, SUCH AS BLOOD CORPUSCLES
Filed Feb. 7, 1933  2 Sheets-Sheet 1

1- ABSORPTION CURVE FOR NORMAL BLOOD
2- AND SAME SATURATED WITH PURE CO
DILUTION 1/10  CELL 1mm

DENSITY

WAVELENGTH

Inventors:
Frank Twyman
David Henry Follett
By Their Attorneys

Sept. 25, 1934.  F. TWYMAN ET AL  1,974,522
COUNTING OF MICROSCOPIC BODIES, SUCH AS BLOOD CORPUSCLES
Filed Feb. 7, 1933   2 Sheets-Sheet 2
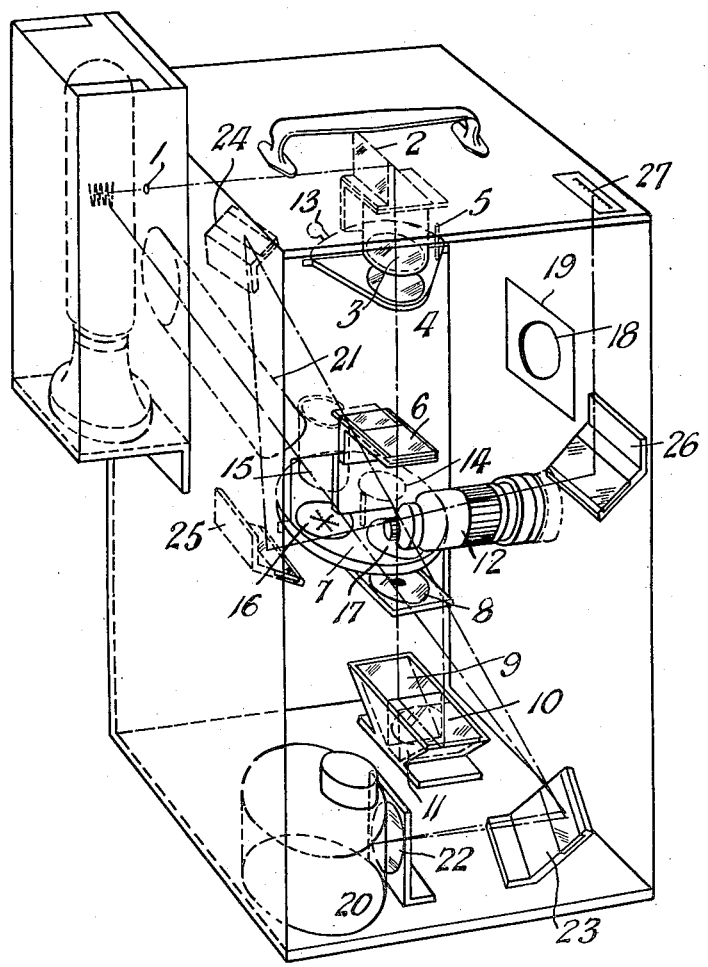
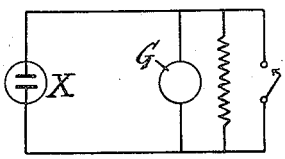
Inventors: Frank Twyman
David Henry Follett
By Their Attorneys Baldwin & Wight

UNITED STATES PATENT OFFICE 1,974,522

COUNTING OF MICROSCOPIC BODIES, SUCH AS BLOOD CORPUSCLES

Frank Twyman and David Henry Follett, Camden Road, London, England, assignors to Adam Hilger, Limited, London, England Application February 7, 1933, Serial No. 655,648
In Great Britain February 5, 1932

17 Claims. (Cl. 88—14)

This invention relates to apparatus adapted for the enumeration of microscopic particles, such as blood corpuscles. It also relates to modifications in such apparatus rendering it capable of:—

(a) Measuring the diameter of the particles;

(b) Estimating the concentration of a coloured substance, e. g. haemoglobin, or of two substances of different absorptive capacities, e. g. haemoglobin and carboxyhaemoglobin, present in a solution; and (c) Estimating the degree of flocculation in media such for example as bacterial aggregations suspended in blood sera.

According to the invention, apparatus for the enumeration of suspended microscopic particles comprises means constructed and adapted for passing light through a specimen, and for measuring the light diffracted by the particles.

According to a further feature of the invention, in measuring the size of the particles, the light diffracted from the corpuscles is allowed to form an image, and the coloured rings produced are measured.

According to a still further feature of the invention, for measuring degree of flocculation, light is passed through the specimen, and the light scattered in a direction transverse or inclined to the incident light is measured.

According to a still further feature of the invention, for measuring the quantity of coloured substances present in solution, light of a restricted wave length is passed through the specimen, and the light transmitted is measured.

Figure 1:
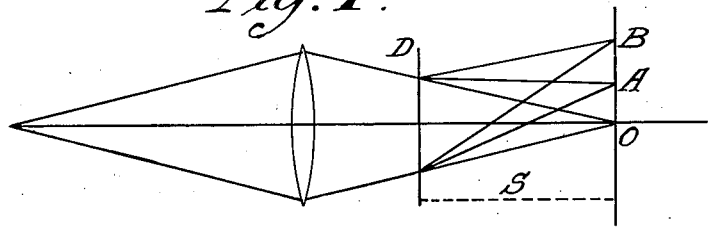
Figure 2:
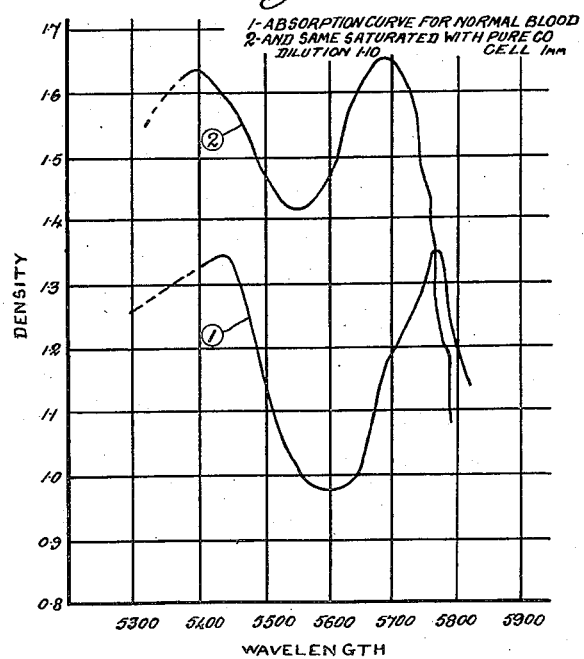
Figure 6:
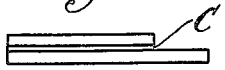
Figure 4:
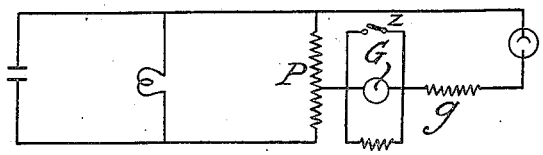

The invention will be made clearer by reference to the accompanying drawings, in which Figure 1 is a diagram showing diffraction from an opaque particle; Figure 2 shows curves giving the light absorption for normal blood, and for the same saturated with CO; Figure 3 is a diagrammatic view of a preferred embodiment of the apparatus; Figures 4 or 5 are circuit diagrams showing preferred light sensitive arrangements and Figure 6 is a diagrammatic view of a specimen holder.

Before describing suitable forms of apparatus, the principle of the various features of the invention will be explained.

*Measurement of the diameter of the suspended particles, e. g. red corpuscles*

When a pencil of light passes through a system of obstacles, a part of the light is diffracted, and if these obstacles, being in the same plane, are not so crowded that they overlap, and are all approximately the same size, a regular diffraction pattern is obtained if the light is brought to a focus. To take a specific instance in Figure 1, if D is the diffracting surface the direct image is formed at O while diffracted images are formed at A and B.

Whatever the form of the obstacles the diffraction pattern remains of the same general type; if a point source of light is used an image of this point is formed, surrounded by a system of concentric rings. The diameter of these rings depends upon the wavelength of the light and the size of the particles. Actually, the intensity of the light in the system passes through a series of maxima and minima as the radius increases from the centre. The shape of the curve connecting radius and intensity depends upon the form of the particles: upon whether, for example, they are opaque circular discs, or annular discs. Experiment shows that the positions of the maxima and minima formed by blood corpuscles agree fairly closely with those given by a system of opaque circular discs, although the intensities of the maxima relative to the direct image are not in accordance with the assumption. Theory shows, in fact, that for most forms of obstacles with circular boundaries the positions of the first one or two maxima are very nearly the same, the chief difference being in the relative intensities.

On this assumption the radius of the first order rings due to blood corpuscles will be given by $$\frac{R}{\sqrt{R^2+S^2}}=0.82\frac{\lambda}{r}$$

where
  $r$=radius of discs,
  $\lambda$=wavelength of light,
  $R$=radius of the rings,
  $S$=distance of specimen from screen on which rings are formed.

By measuring the radii of these rings, the diameter of the blood corpuscles producing them can be calculated. The method has been explored fairly thoroughly by Pijper, British Medical Journal 1929, (i) p. 635 assuming that the corpuscles behave as opaque discs and found to give results agreeing with other methods within the limits of accuracy of the method. He states that results obtained from the yellow ring in the system give a diameter value which can usefully be regarded as an average for all the corpuscles present; using the inside of the inner blue ring the largest size can be determined; and from the outside of the red ring the smallest corpuscle can be determined. The deductions are based on the implied assumption that if the corpuscles were all the same size sharp rings would be formed in monochromatic light; diffuseness in the rings therefore would be due to the fact that the corpuscle diameters cover a range of values.

Actually, however, both theory and experimental observation show that even using monochromatic light, and with opaque particles all of the same size, the rings are diffused.

Observation through a colour filter so that the rings due to light of a narrow range of wavelengths only are seen, removes one of the sources of uncertainty (namely, that of deciding what wavelengths to substitute in the formula when the inner and outer rings are measured).

Enumeration of the particles

Theoretically, the total intensity of the diffracted light is proportional to the total area of the diffracting discs, so that if this intensity is measured, and if the mean area of the particles is known, the total number can be found.

Estimation of a coloured substance present in solution, e. g. haemoglobin

In measurements of the haemoglobin content, the indications of the instrument are a measure of the radiation transmitted by a solution of the blood suitably diluted, the measurements being rendered more specific by the addition of a light filter carefully chosen to pass only those radiations which are absorbed by the haemoglobin. Thus the effect of the absorption of the haemoglobin is not swamped by the presence of unabsorbed radiation. The method might be used in the estimation of the vitamin activity of cod liver oil by the antimony trichloride test.

Estimation of carboxyhaemoglobin

The use for the determination of the presence of carboxyhaemoglobin is more complex.

It has long been known that if a curve be drawn connecting the absorption of a solution of haemoglobin with the wave length of light, and another similar curve be drawn of the absorption of the same solution in which the haemoglobin has been converted into carboxyhaemoglobin, results are obtained such as shown in Figure 2.

Referring to Figure 2, it will be observed that for all points of the curve up to wave length 5770A the effect of converting the haemoglobin to carboxyhaemoglobin is to increase the absorption. Thus, if a filter be used which permits no radiation to pass except within the range of wave lengths from 5000A to 5770A, the amount of absorption can be used to determine not only the amount of haemoglobin present, and also the percentage of carboxyhaemoglobin present, always provided that no other substances are present having absorption in this region (and this could be done also by direct visual means—as, for instance, by a flicker photometer). The procedure is as follows:—

The intensity is measured of the radiation which has passed through a filter of blood suitably diluted. A light filter is used which allows to pass only the radiation in the wave length range within which it can be said that no only do haemoglobin and carboxyhaemoglobin absorb strongly, but also that the CO Hb curve is everywhere higher than the Hb curve.

If we consider:—
A. The specimen of normal blood;
B. The same specimen fully saturated with CO;
C. The same partly saturated with CO,
it is evident from the shape of the absorption curves that the intensity of the light transmitted by C will be intermediate between that for A and that for B.

Hence, for any original strength of haemoglobin in A there will be a unique connection between intensity of transmitted light for C and percentage of Hb converted into CO Hb—the deflections being expressed in terms of that for A or for C.

To determine the percentage in a given unknown blood X, therefore, one takes a reading on the instrument with X; then with the same fully saturated, determining the percentage from a graph previously drawn empirically for various known strengths of C.

The method is applicable to other binary mixtures of absorbing substances in which a suitable wave length range can be used and in which the solution can be brought to a standard ratio of the one substance relative to the other as for instance by bleaching out one constituent or by converting one constituent to the other or in which the solution can be brought to a standard dilution. Alternatively the whole of the solvent may be evaporated, and the total quantity of both substances ascertained by weighing. The method is, of course, not restricted to the use of any one means of measuring radiation.

One possible form of apparatus uses as the effective source of light a small circular aperture upon which light from a suitable source is concentrated. The light emerging from this aperture is rendered parallel by a convex lens, passes then through the sample, and an image is formed by another lens. This will consist of an image of the aperture surrounded by coloured rings. This image is formed on a white diffusely reflecting surface. A hole is cut in this surface, the same size as the direct image of the aperture, and all the light forming this image passes through this hole. The white surface therefore receives only the diffracted light. The amount of light which is reflected from the white surface is measured by a photo-electric cell and gives a measure of the number of bodies or particles.

Ideally, when no sample is in position, there should be no light falling on the white surface at all, but from such causes as reflections from the back of the lamp, and scattering at the various surfaces and dust particles in the air, it is not likely that these conditions can be perfectly attained. This, however, should introduce very little error if the difference between the photo-electric currents before and after the sample is put in position is taken as the reading from which the count is derived.

A preferred form of the apparatus is illustrated in Figure 3.

The instrument is entirely contained within an aluminium case with a handle on top. The light enters this box through a hole 1 of variable size from a lamp mounted on the outside of the back plate of the rearside of the box. The light is received and directed downwards by a right angle prism 2, immediately below which is situated a lens 3 which forms an image of the hole 1 on a black spot on the surface of the lens 8. Immediately below the lens 3 is a ground glass diffusing plate with an iris diaphragm immediately below it. It is preferred to make these in one unit, which is indicated in the drawings at 4. Plate and iris diaphragm can be swung out of position on the hinge 5; there is a lever 13 which opens and closes the iris diaphragm, this lever being accessible from the outside of the box and moving over a scale which, therefore, indicates the extent to which the iris has been opened.

When this whole arrangement has been swung out on its hinge, the light can proceed downward, and at the stage 6 it encounters the blood film when the apparatus is being used for counting the red corpuscles and measuring their diameter.

At 7 is a circular platform, and on this platform are indicated a fitting 17 for taking the cell containing the diluted blood when the instrument is being used for the estimation of haemoglobin (and carboxyhaemoglobin); a tube holder 15 for containing the tube of prepared serum when the instrument is being used for flocculation tests; a screen 16 on which the diffraction rings become visible, three scales being marked on the screen calibrated in terms of diameters of blood corpuscles. One of these is for the outer red ring, one for the yellow, and one for the inner blue ring. This measuring screen may be a white screen, but when observed through a colour filter passing substantially monochromatic light (the advantage of which has been pointed out) the rings are insufficiently bright. The screen then preferably consists of a concave mirror or a lens mirror which concentrates the light on the eye; a further improvement making for comfort and convenience in reading being that a surface of the mirror or lens mirror may be made feebly diffusing by being slightly greyed. One form, for instance, consists of a glass disc, with a silvered surface on the back concave to the incident light (i. e. convex from the exterior) and the front surface very lightly greyed. This is mounted with the front surface towards the light passing the blood corpuscles, and the curvature is such that an image of the blood film is formed on the observer's eye. It is mounted on the tilt so that the light is reflected towards the observer. There is also a clear aperture 14 in the table 7.

By rotating the platform we can arrange that the appropriate section is in place. An indicating device shows when the desired section is in position.

When the clear aperture is in position, the image of the light source then falls on a black spot painted on the lens 8. This prevents the direct radiation proceeding any further, so that only diffracted and scattered radiation passes this lens.

The radiation is reflected by the right-angled prism 9, then passes through the lens 10, and is reflected onto the photo-cell or other light sensitive element at 12 by the prism 11 forming at 12 an image of the blood sample. The photo-cell can be orientated in one of two directions— first it can be directed with its aperture downwards so as to receive the radiation which has come to it by the path described above, or alternatively, its aperture can be directed sideways, so as to receive the scattered light from the cell containing the blood serum or other liquid of which it is desired to measure the scatter or deviation of light.

The photoelectric cell is connected with the galvanometer 20.

Light from the source is also directed through the tube 21, to the galvanometer mirror (not shown in the drawings) by way of the mirror 23 and the lens 22, and is reflected by way of mirrors 23, 24, 25, 26 to the scale 27 on which the galvanometer readings are made. The lens 22 is used to adjust the focus of the galvanometer mirror to the distance of the scale.

When the diameters of the blood corpuscles are being measured, it is necessary that the rings should be as sharp as possible. The hole 1 must therefore be as small as possible. But insufficient light is then admitted to allow a measurement of the number of blood corpuscles to be made.

At 18 an observation hole is provided for observing the screen when measurements of the diameters of the corpuscles are being made, and a colour filter 19 may conveniently be provided covering the hole 18.

Also, when the haemoglobin measurements and the flocculation tests are made, still more light is needed. The hole 1 is therefore made larger and a short focus lens placed over it to form an image of the lamp filaments, approximately on the right-angled prism 2. For measurements where less light is needed, a sliding screen with holes the required size in it may conveniently be provided for partially obscuring the hole.

A suitable source of light is a 100 watt projector lamp run direct from the mains. It is placed, as shown in Figure 5, so that the axis of the optical system is nearly, but not quite, in the plane of the filament. If the light, after passing the hole, then spreads out so that the aperture of the first lens is just filled, the best possible use is made of the light available.

A suitable light sensitive device is a very sensitive gas filled photoelectric cell. The circuit is shown in Figure 4.

P is a 50,000 ohm wireless potentiometer, which is adjustable by the operator to vary the sensitivity of the photo-cell, if necessary, though stops are fixed so that it is impossible to apply a dangerously high voltage to the cell. A grid leak $g$ protects the cell and the galvanometer if the voltage or illumination should by any accident rise so high as to start a glow discharge in the cell. The galvanometer G is shunted permanently by about 100 ohms to make it deadbeat, Z is a switch which is closed when the instrument is not in use in order to damp out vibrations of the galvanometer made when the instrument is moved about, thus reducing the possibility of damage.

(For an A. C. supply, if this cell is to be used, it would be simplest to use a dry battery. It may be possible, however, to use the Weston photronic cell, to which no voltage need be supplied.)

A second light sensitive arrangement is shown in Figure 5, X is the photronic cell. The galvanometer is of the same type as in the previous circuit.

As this circuit needs no voltage supply, it is immaterial whether the mains supply available is A. C. or D. C., since only the lamp is run from it.

*For enumerating blood corpuscles*

The blood as taken from the patient is suitably diluted with any of the colourless fluids used for diluting blood in haemocytometry, with an ordinary pipette used in haemocytometry, and introduced into the cell as a specimen in substantially planar form. This consists of two fairly good pieces of optical glass spaced $\frac{1}{10}$ mm. apart to an accuracy of about 2%, as shown in Figure 6. The blood is introduced by dropping it from the pipette at the point C, when it runs between the plates by capillary attraction. The plates must be very clean. The platform 7 (Figure 3) is swung into the position so that the light reaches the lens 8 uninterrupted. The deflection of the galvanometer is then noted. The iris diaphragm and diffusing plate 4 are swung into the beam and adjusted until the same galvanometer deflection is produced. The setting of the diaphragm is checked by swinging the diaphragm out again and then in again, this operation being repeated until the operator is satisfied that a match is made. The setting of the diaphragm is then read. From this reading, and from the measurement of the size of the blood cells, the value for the number is obtained from tables provided. (It may not be necessary to take the size into consideration.) It is not necessary to remove the blood sample from the beam of light when the diffusing plate is swung into the beam because under these conditions practically all of the light, which is spread by the diffusing plate, passes through the blood sample without being diffused and/or absorbed appreciably. The total light passing through the lens 8 around the black spot will be practically the same whether the blood sample be in the beam or not. In practice it is more convenient not to remove the sample when the diffusing plate is swung into the beam.

By this method of measuring the light intensity in the scattered beam the effect of variations in the voltage of the mains supply is eliminated.

It is necessary to check the calibration occasionally, say, once a week, or perhaps even every day, by putting in the place of the blood film a "standard" blood film (e. g. permanently fixed blood smear).

*Measurement of the diameter of blood corpuscles*

The platform 7 is moved so that the screen 16 with its scales is moved into the beam. On looking at this screen, a system of coloured rings will be seen. The point on the scale which may conveniently be marked, say, R, where the outer red ring is just fading out, is observed, and the indication of the scale at this point read. This reading gives the smallest sized blood corpuscle present.

Care must be taken not to choose the wrong red ring. The innermost ring of all is red, but this is not the one to read from.

The reading of the middle of the yellow ring on the scale, which may be marked α, gives the average size of the blood cells.

The violet ring must be read on the scale, which may be marked V at the innermost radius, where it is fading into the inner red ring referred to above, and this reading gives the largest sized blood corpuscles present. These observations follow the principles laid down by Pijper.

The sample used for enumeration of the corpuscles may also be used for this measurement. It is usual in this measurement to use dry blood smears but in making these smears the corpuscles tend to be distorted. Also, there is a kind of sorting out, the larger corpuscles being found at one end of the smear and the smaller ones at the other. By the use of diluted blood these disadvantages are overcome.

An alternative method of taking readings is to observe the system through a filter transmitting only a narrow range of wavelengths. (Wratten No. 74 is very suitable.) Observation of the inner, outer, and brightest diameters of the green ring observed then gives the largest, smallest, and average diameters of blood corpuscle present. By this method, only one scale on the screen is needed, since all the readings are taken with light of the same wavelengths.

Calculations of red corpuscle diameters made from measurements of the rings accord with direct measurements of the corpuscles as made under the microscope.

In some diseases blood corpuscles lose their circular shape. The effect of this is to produce an increased diffuseness in the diffraction rings, and it is considered that this may be roughly correlated with the extent of the loss of shape.

*To measure flocculation*

The tube containing the serum is put into the tube holder 15 which may conveniently be opaque, and provided with a transparent window and swung into the beam. The largest light admitting aperture is used, and a cap is placed over the top of the tube holder; there is an aperture in this cap which limits the beam so that all the light admitted passes through the liquid and no light passes outside it. The photo-cell is turned so that it is facing the hole in the holder. The galvo-deflection is noted. The tube is then swung out so that the lens 8 is able to transmit light. The diaphram and diffusing plate 4 are swung in, and the photo-cell turned to face the prism 11. The diaphragm is adjusted so that the galvo-deflection is the same as that obtained in the other position, in the same way as in the method for enumerating blood corpuscles. The reading of the diaphragm then gives the degree of flocculation.

A cylinder of milky glass is provided and is used as a standard for checking the calibration periodically, a measurement of its "flocculation" being taken exactly as described above.

*To make measurements on the quantity of haemoglobin*

The blood sample, for example, diluted with distilled water to $\frac{1}{10}$, is introduced into a ⅓ mm. cell, and the cell is placed in position on the table. The special blue filter provided is pushed on to the stage 6, and the blood sample swung into the beam. The largest possible light admitting aperture is used, so that the loss of light due to the black spot on the lens 8 is unimportant. The deflection of the galvanometer is noted. The table is swung round into such a position that light can arrive at the lens 8, uninterrupted, and the iris diaphragm 4 swung into position. The diaphragm is adjusted until the deflection is the same as with the blood sample. The reading of the iris diaphragm then gives a measure of the intensity of the light transmitted. From this, reference to a calibration curve gives the amount of haemoglobin in the sample.

The additional operations for determining the amount of carboxyhaemoglobin, as outlined in the section on the principles utilized in the instrument, involve only transmission measurements made in this way, so far as this instrument is concerned.

Throughout the specification the term "light" includes infra-red and ultra-violet radiation.

What we claim is:—

1. Apparatus for the enumeration of microscopic particles, e. g. red corpuscles in blood, comprising a light source, means for holding a substantially planar specimen in the path of rays from the light source, and means for measuring the light diffracted from the particles in the specimen.

2. Apparatus for the enumeration of microscopic particles, e. g. red corpuscles in blood, comprising a light source, a lens and adjustable means for limiting the light supplied by the light source, a holder for a specimen placed in the path of rays from the light source, means for obscuring the direct image, and means for measuring the light diffracted from the particles.

3. Apparatus for the enumeration of microscopic particles e. g. red corpuscles in blood, comprising a light source, a lens and means for adjustably limiting the light supplied by the light source, a holder for a specimen placed in the path of rays from the light source, means for obscuring the direct image, and a light sensitive element exposed to the light diffracted from the particles.

4. Apparatus for the enumeration of microscopic particles e. g. red corpuscles in blood, comprising a light source, a lens and means for adjustably limiting the light supplied by the light source, a holder for a specimen placed in the path of rays from the light source, means for obscuring the direct image, and a photoelectric cell exposed to the light diffracted from the particles.

5. Apparatus for the enumeration of microscopic particles, e. g. red corpuscles in blood, comprising a light source, a lens and means for adjustably limiting the light supplied, a stage for carrying a specimen holder, means for obscuring the direct image, and a light sensitive element exposed to the light diffracted from the particles.

6. In a method for enumerating microscopic particles in a specimen, e. g. red corpuscles in a blood specimen, the steps of passing light through said specimen and measuring the light diffracted by the particles.

7. In a method for enumerating microscopic particles in a specimen, e. g. red corpuscles in a blood specimen, the steps of passing light through said specimen, and bringing the light to a focus, trapping the direct image, and measuring the intensity of the light diffracted from the particles.

8. A method for the investigation of solutions and suspensions, e. g., for the analysis of blood, which comprises passing light through a specimen and measuring the light diffracted by the particles e. g. red corpuscles to enumerate the same, observing through a colour filter the diffraction rings produced, and measuring them to ascertain the size of the particles, photoelectrically measuring the light scattered by the specimen to ascertain the degree of flocculation; and in order to ascertain the quantities of two substances of different absorptive capacities both of which are absorptive, e. g. haemoglobin and carboxyhaemoglobin present in solution, passing light of a frequency range in which the absorption of the two substances is different through a specimen, measuring the light transmitted by the specimen, and comparing it with the light transmitted by a standard specimen.

9. A method for ascertaining the size of microscopic particles, e. g. red corpuscles in blood, which consists in passing light through a specimen of the substance under investigation, observing through a colour filter the diffraction rings produced, and measuring them.

10. A method for estimating the quantities of two substances of different absorptive capacities both of which are absorptive, e. g. haemoglobin and carboxyhaemoglobin present in solution, which consists in passing light of a frequency range in which the absorption of the two substances is different through a sample specimen containing two such substances, measuring the light transmitted by the sample specimen, and comparing it with the light transmitted by a standard specimen.

11. Apparatus for enumerating and measuring microscopic particles, e. g. red corpuscles in blood, comprising a casing having an observation hole therein, a light source, a lens in the path of the light from said source, means also positioned in the path of light from said source for adjustably limiting the light supplied along said path, a stage positioned within said casing carrying a specimen holder located to be illuminated by light passed by said lens and adjustable limiting means, a rotatable table having an aperture and carrying a measuring screen, said table being so positioned that either said aperture or said measuring screen may be at will positioned in the path of light passing through the specimen, means located on the side of the table remote from the specimen holder for obscuring the direct image, and a light sensitive device positioned to receive the light diffracted from particles contained in the specimen, the observation hole being so positioned in the casing as to permit observation of the measuring screen when the same is moved into the path of light passing through the specimen.

12. Apparatus as claimed in claim 8 comprising a colour filter covering the observation hole.

13. Apparatus as claimed in claim 8 in which the measuring screen comprises a converging mirror.

14. Apparatus as claimed in claim 8 in which the measuring screen comprises a converging mirror with a slightly diffusing surface.

15. Apparatus for enumerating and measuring microscopic particles, e. g. red corpuscles in blood, and for measuring the degree of flocculation in a medium, comprising a casing having an observation hole therein, a light source, a lens in the path of light from said source, means also positioned in the path of light from said source for adjustably limiting the light supplied along said path, a stage positioned within said casing carrying a specimen holder located to be illuminated by light passed by said lens and adjustable limiting means, a rotatable table having an aperture, and carrying a measuring screen and a fitting adapted to contain a specimen tube, said table being so positioned that either said aperture or measuring screen may be at will positioned in the path of light passing through the specimen, and that said specimen tube may be positioned so as to receive light passed by the lens and light limiting means, means on the side of the rotatable table remote from the specimen holder for obscuring the direct image of light passed by the specimen on the stage, and an adjustably mounted light sensitive device positioned so as to be able to receive light diffracted from the particles of the specimen in the specimen holder, or light scattered by the particles in the specimen tube, the observation hole being so positioned as to permit observation of the measuring screen when the same is moved into the path of light passing through the specimen.

16. Apparatus for enumerating and measuring microscopic particles, e. g. red corpuscles in blood, for measuring the degree of flocculation in a medium, and for measuring the quantities of coloured substances, e. g. haemoglobin and carboxyhaemoglobin present in solution, comprising a casing having an observation hole therein, a light source, a lens in the path of light from said source, means also positioned in the path of light from said source for adjustably limiting the light supplied along said path, an adjustably mounted diffusing plate adapted to be brought into said path, a stage positioned within said casing carrying a specimen holder located to be illuminated by light passed by the lens and adjustable limiting means, a rotatable table having an aperture and carrying a measuring screen, a fitting adapted to carry a specimen tube, and a fitting for a second specimen holder, said table being so positioned that either said aperture or measuring screen may be at will positioned in the path of light passing through the specimen, and that said specimen tube and second specimen holder may be so positioned as to receive light passed by the lens and limiting means, means on the side of said table remote from the first specimen holder for obscuring the direct image formed by light passing through the first specimen, and an adjustably mounted light sensitive device positioned so as to be able to receive light diffracted from particles contained in the first specimen holder, or light scattered by particles in the specimen tube, or light transmitted through the second specimen holder, the observation hole being so located as to permit observation of the measuring screen when the same is moved into the path of light passing through the first specimen holder.

17. Apparatus as claimed in claim 12 in which a colour filter covers the observation hole substantially as and for the purpose described.

FRANK TWYMAN.
DAVID HENRY FOLLETT.